May 21, 1940. W. J. D. VAN DIJCK 2,201,549

PROCESS FOR THE SOLVENT EXTRACTION OF LIQUID MIXTURES

Filed July 9, 1935     2 Sheets-Sheet 1

Inventor: Willem J.D. Van Dijck

By his Attorney:

Patented May 21, 1940

2,201,549

UNITED STATES PATENT OFFICE 2,201,549

PROCESS FOR THE SOLVENT EXTRACTION OF LIQUID MIXTURES

Willem J. D. van Dijck, The Hague, Netherlands, assignor to Shell Development Company, San Francisco, Calif., a corporation of Delaware Application July 9, 1935, Serial No. 30,495
In the Netherlands July 14, 1934

9 Claims. (Cl. 196—13)

This invention relates to an improved process for the extraction of liquid mixtures with selective solvents, and more specifically is concerned with improvements therein in which two or more liquids are treated with the same selective solvent.

It is an object of my invention to provide a process for extracting two or more liquid mixtures with a selective solvent in a manner to obviate the necessity of distilling large quantities of selective solvent normally employed in extraction processes. It is a further object of this invention to provide a process by which two or more liquid mixtures may be separated into their components by extraction with the same selective solvent without distilling or otherwise treating any or all of the several extract phases produced in the successive extractions of the different mixtures to recover the solvent in a pure state, thereby effecting a substantial economy in the cost of operation and of equipment. Other objects of my invention will be apparent from the following specification.

Figure 1:
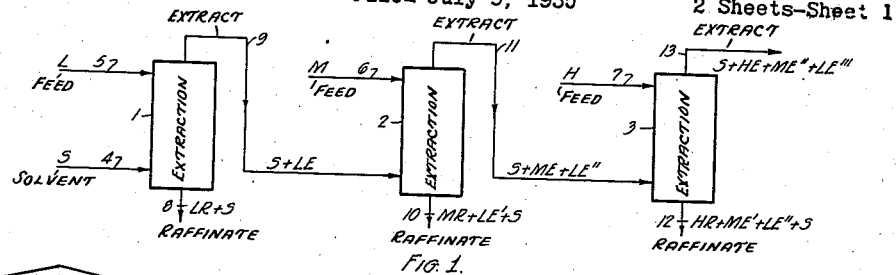
Figure 2:
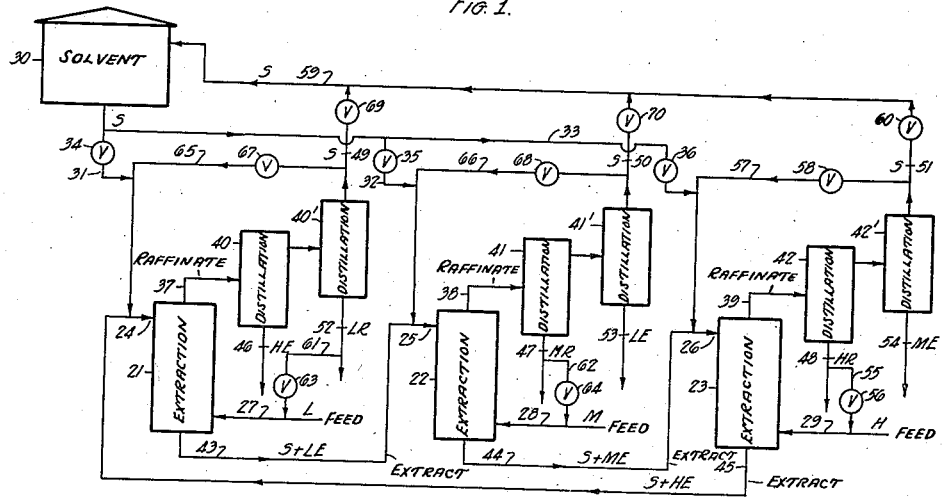
Figure 3:
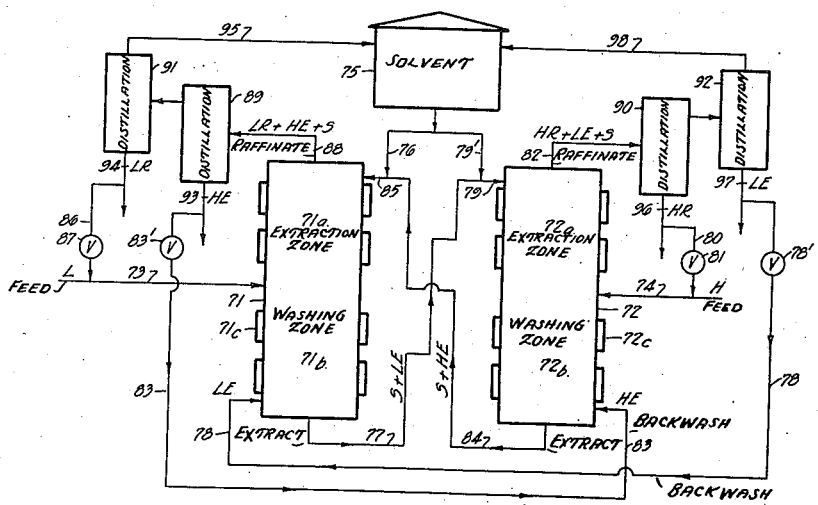
Figure 4:
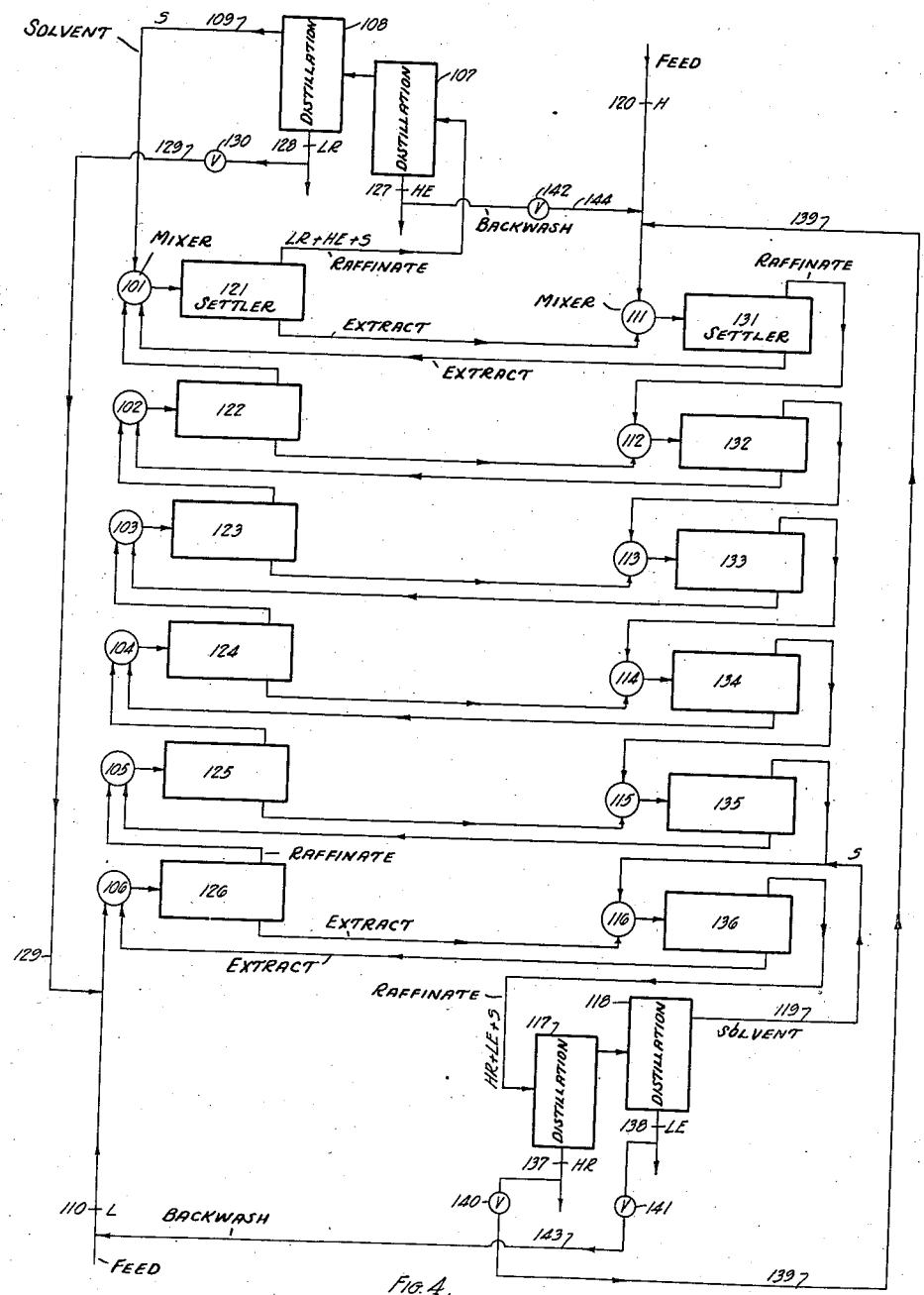

I have found that two or more liquid mixtures can be split up into their components by extracting them with one and the same solvent used in a series of extraction zones, without recovering the solvent in a pure state between successive extractions of different liquid mixtures if these liquid mixtures to be split up, or their components, are such that each liquid mixture or its components can be separated from all or, at times, from certain of the other mixtures or their components outside the extraction zone. The necessity and extent of this requirement will be explained in the course of the detailed description of the invention in connection with the accompanying drawings, in which:

Figure 1 is a diagrammatic flow sheet illustrating the principle of my invention and representing one embodiment thereof; and Figures 2, 3, and 4 are similar flow diagrams showing modified embodiments thereof.

Referring first to Figure 1, numerals 1, 2 and 3 represent extraction apparatus, which may be single- or multi-stage continuous countercurrent treaters, or packed towers suitable for the countercurrent treatment of liquids of different specific gravities, or centrifugal contact devices, etc., although neither the use of the countercurrent principle nor the use of towers or columns is essential for practising my invention, since it can also be carried out in a number of mixers and settlers, operating either continuously or intermittently. Moreover, 1, 2 and 3 may be portions of the same vertical liquid contact chamber, provided with means for introducing the feed and for withdrawing all or portions of one of the liquid phases at an intermediate point. Numerals 4, 5, 6 and 7 represent, respectively, inlets for introducing a selective solvent, and the liquid mixtures L, M and H to be extracted. Pipe conduits and other apparatus will be described in the course of the explanation of the operation of the process, it being understood that the apparatus may be equipped with suitable pumps, valves, heat-exchangers and other adjuncts which are not specifically recited. The parts which dissolve in the solvent are represented by the letter E, with or without accents, placed after the letter indicating the liquid mixture from which the solvent removes a part (= extract). Thus, LE represents an extract from L; ME' an extract from M. The insoluble parts are represented by placing the letter R after the letter indicating the liquid mixture in which this insoluble part occurs. Thus LR is the insoluble part (raffinate or residue) of L.

Assuming the solvent to be lighter than the liquid mixture L, the solvent, indicated by the letter S, enters column 1 at the bottom. The mixture to be split up (L) is admitted at the top. L and S flow through the column in countercurrent to each other. The undissolved part of L, viz., LR, flows out at the bottom of the column through a conduit 8; it is generally contaminated with a small quantity of the solvent used.

The solvent S with the dissolved part LE leaves the top of the column through a conduit 9. This LE+S is now led into column 2 at the bottom, where it acts as extracting agent for the liquid mixture M, which is led in at the top of the column at 6. An exchange takes place between the components of the two streams. A part, namely ME, is withdrawn from M, but part of LE leaves the extracting agent at the bottom and mixes with the undissolved part of M, namely with MR. A mixture of MR+LE' leaves this column through an outlet 10. It is somewhat contaminated with S. The greater part of the solvent S leaves the top of the column through a conduit 11, laden with ME and with that part of LE which has not passed over into the other phase (MR phase); it is indicated in the diagram by LE". The stream of S+ME+LE" is then led into column 3 at the bottom, and the liquid mixture H is extracted in countercurrent to this stream.

Part of ME and LE" passes into the HR phase, so that the insoluble part HR, mixed with a portion of the parts of ME and LE" from the other (S) phase and contaminated with a small quantity of S, leaves column 3 at the bottom through an outlet 12. A solution of HE in the greater part of the solvent S, which solution is mixed with the parts of ME and LE" which have not passed into the HR phase, viz., ME" and LE", leaves the top of the column at 13.

It is apparent from the above that the process according to the invention is characterized by the fact that the solvent laden with extract obtained as a result of an extraction is used as extracting agent for the extracting of the next liquid mixture.

As a result of the extraction process various new liquid mixtures are obtained. It is clear that these new mixtures must be separated from one another by some means other than the extraction process used, as otherwise the whole process would be to no purpose.

The manner in which it is desired to separate the mixtures which are withdrawn from the extraction zones is of no account; the main point is that the mixtures can be separated. Any of the well-known chemical or physical separation methods may be applied, e. g., washing out with chemicals, fractional distillation, azeotropical distillation and the addition of a new component, if necessary, to the mixture which is to be split up, cooling, e. g., freezing, crystallization, extraction. After the separation it is possible partly to reintroduce several of the components obtained into the process again, if this is desirable for good extraction and particularly for the regulation of the process in one of the columns.

It will be noted, for instance, that the process can be carried out in the second column in such a way that the whole quantity of LE can be washed out of the S+LE solution by means of a sufficient supply of the mixture M. The situation then becomes such that only S+ME issues from the top of the column, while at the bottom of the column a mixture of MR and LE contaminated with a small quantity of S flows away.

It has now been found that by the proper application of this possible arrangement (or arrangements) more latitude can be obtained as regards the conditions mentioned in the 3rd paragraph of this specification, with which the mixtures must comply to render a complete splitting up into their components possible, and that it is only necessary that: 1. all components can be liberated from the solvent S; 2. the extract of the $n$th mixture can be separated from the residue of the $(n+1)$th mixture.

Supposing the extraction process indicated in Fig. 1, in its improved form as just described, is ended after column 2, it must be possible, if no further conditions are imposed, to separate, apart from the extraction process: S from ME, MR from LE' and both of them from S—leaving out of consideration for the moment that the residue or raffinate phase of L is also contaminated with solvent, so that it should also be possible to separate it from S.

If the principal purpose of carrying out an extraction of two liquid mixtures is the preparation of valuable products from the second mixture, for which a good extracting agent in the form of S+LE has been made, it may occur that the residue of the first extraction can be considered valueless and no further pains need be taken to separate it from the adulteration (=S).

It is possible that the extract of the second mixture (ME) is the desired product. In that case it will be necessary, for the preparation of ME, to free this component from S, in which it is dissolved. But the mixture of MR+LE' leaving the second column may also be the desired mixture, in which case the separation of these two components is unnecessary.

In general, therefore, when the aim is to obtain valuable products without desiring the complete separation of the various components, one or more of the additional separations outside the actual extraction apparatus will be dispensed with. A few examples will illustrate the cases described above.

An asphalt fluxed with aromatics is required. If a kerosene is extracted with alcohol and the extract solution obtained is used as extracting agent for an asphaltic petroleum distillation residue, the desired mixture of asphalt (MR)+kerosene extract (LE) is produced in the second column, adulterated with a little of the solvent. The kerosene free of aromatics which is also produced (column 1:LR) still contains a little alcohol, which need not be separated from it for the preparation of a saleable product. The recovery of the solvent may be dispensed with if the extracting agent is cheap, as when water is used as the extracting agent and the last extract is valueless.

It is also possible to extract gas oil and afterwards gasoline with the aid of liquid $SO_2$ or furfural. The products obtained are gas oil raffinate with a high cetene number, gas oil extract + benzene raffinate, which may be led to a cracking apparatus, and benzene extract with a high octane number + solvent.

In the case of the extraction of hydrocarbon oils, for which the process explained above is particularly suitable, it is a well-known fact that an extract of a light fraction which is present in the solvent exercises a favorable influence on the extraction of a heavier oil, either by dilution of the heavy extract phase (change in viscosity), or by a change in the selectivity of the solvent S. It is clear that the above is not restricted to the mixtures of hydrocarbon oils, but that a similar favourable effect is also possible for other mixtures. The process according to the invention can be applied to all sorts of liquid mixtures. The latter may contain solids in solution. The main point is that there are always two liquid phases in contact with one another.

The process can be applied at various temperatures and pressures, elevated, normal or low, whereby especially the circumstances in the various extraction stages may vary, so as to obtain the most favourable conditions for each stage. If, for example, ME is less readily soluble than LE, higher temperatures will be used in the second column than in the first, in order yet to obtain an economic concentration of ME in S. Between the first and the second column heat exchangers for the flowing solvent will be provided. The process can also be used in connection with extraction processes other than the one described in Figure 1, e. g., with a double-countercurrent extraction process, as described in my Patent No. 2,023,109, issued December 3, 1935, and/or with a temperature gradient, as described in Patent No. 2,081,720, issued May 25, 1937; and/or with the backwash process described in Patent No. 2,081,719, issued May 25, 1937. The advantages of the process lie in the repeated use of the extracting agent, in the direct use of solvent charged with extract for a following extraction and in the further splitting up of the extract obtained in a previous stage, e.g., LE, into two other portions in a later stage, e.g., when extracting M.

The extent to which the extract dissolved in the selective solvent is removed from the extract phase depends, inter alia, on the quantity of liquid with which the said extract phase is treated. This quantity may be increased without the use of additional quantities of other liquid mixtures by allowing all or a part of the recovered components to be recycled. In this way, for example, a part of HR can be returned to the conduit 7, or a part of MR can be returned to conduit 6 in Figure 1. Similarly, a part of ME, or a blend of MR and ME can be returned to conduit 6.

When carrying out the process described with reference to Fig. 1, it was also found that the solution of extract (or extracts) in solvent obtained by the last extraction can again be used as extracting agent for the splitting up of the first liquid mixture. In doing so it is of advantage when splitting up the liquid mixtures to carry out the extraction in each stage in such a manner that the solvent leaving that extraction stage only contains the extract of the liquid mixture split up at that stage of extraction.

A mode of operation embodying certain of these features is illustrated in Figure 2. In this figure 21, 22 and 23 represent extraction apparatus, which may be packed columns, as shown, or any other type of apparatus, as explained above in connection with Figure 1. It being in this case assumed that the solvent is heavier than the liquid mixtures, the columns are provided near their upper ends with inlets 24, 25 and 26 for a selective solvent S or for selective solvent solutions containing extract from a prior extraction, and at their lower ends with inlets 27, 28 and 29 for the liquid mixtures L, M and H respectively. Solvent may be initially supplied to the system from a tank 30 through conduits 31, 32 and 33, controlled by valves 34, 35 and 36 respectively, and small amounts added during the operation to compensate for losses. Raffinate phases are withdrawn from the columns through outlets 37, 38 and 39, and treated in separating apparatus 40, 41 and 42 respectively, and the extract phases are withdrawn at 43, 44 and 45 respectively. The separating units may consist of any apparatus for separating the withdrawn raffinate phases, as explained above, and may, for example, consist of fractional distilling columns or, as shown, of pairs of two distilling columns, as, for example, 41 and 41', which may be operated to isolate only one constituent of the raffinate phase in the first stages at outlets 46, 47 and 48, and to separate selective solvent from the other constituent in the second stage, the solvent being withdrawn at 49, 50 and 51 and the other constituents at 52, 53 and 54.

If—as indicated in Fig. 2—the solution of S+HE obtained by the extraction of H in column 23 is used as extracting agent for L in column 21, it is of advantage that the extracting agent admitted at the top of column 23, which then consists of S+ME, be washed in the column with H in such a way that the whole extract of M, i. e., ME, leaves the column with the raffinate of H (=HR). As it is not always possible to increase the stream of H ad libitum, part of HR and/or HE, obtained by the extraction, may if necessary, be allowed to circulate once more through the column. This may be effected by introducing a portion of HR from outlet 48 through a conduit 55 and valve 56 into the inlet 29. In consequence of this measure, which has also been discussed already in connection with the process illustrated in Fig. 1, all the extract of M (=ME), which enters the column at the top with S, leaves the column again at the top. It will be clear that a mixture of HR+ME, contaminated with a small amount of S, will leave column 23 at the top. In the distillation apparatus 42, for instance, HR is then separated from ME+S, and the vapour mixture ME+S leaving apparatus 42 is then split into the components S and ME in the distillation apparatus 42'. The small quantity of S may be returned into column 23 through a conduit 57 and valve 58, or may be returned to the tank 30 through a conduit 59 and valve 60.

In a similar manner columns 21 and 22 may be provided with conduits 61 and 62 and valves 63 and 64 respectively for recycling portions of the raffinates produced in the respective columns. The solvent from the distillation apparatus 40' and 41' may be returned to the column directly through conduits 65 and 66, and valves 67 and 68, or to the tank 30 through the conduit 59 and the valves 69 and 70.

The advantage of the process shown in Fig. 2 is that the quantity of solvent to be used, with the exception of some small quantities, need not be regenerated anywhere outside the extraction process. This regeneration, which usually takes place by means of distillation, is almost entirely dispensed with by the process according to the invention.

In the case of many extractions, e. g., those of hydrocarbon oils, the heat of evaporation of the solvent is several times greater than that of the hydrocarbons. As, in the case of the extraction of hydrocarbon oils, a solution of some 10% of hydrocarbons in the solvent is generally worked with, and it is not unusual that 30% is extracted from the initial material, at the end of the extraction a quantity of solvent had to be evaporated which was three times as much as that of the mixture to be separated. Consequently, the cost of evaporating the solvent was an important factor, which certainly had to be reckoned with.

In the process described, however, only the small quantities of S which leave the top of the column with the respective raffinate phases R, i. e., MR and HR, have to be separated, outside the extraction process proper, from the components of the separated liquid mixtures obtained. This separation can take place in any of the well-known ways.

Of course, the components of the various mixtures formed as a result of the extracting process must now be separated. In the case of the extraction of hydrocarbon oils this means, if the separation takes place by distillation, that fractions must be separated from one another, the heat of evaporation of which is considerably lower than that of the solvent, while, moreover, the quantities to be evaporated are much smaller; further, distillation of the raffinates is necessary in any case for the separation of the small quantities of S from them, so that the process according to the invention results in a considerable saving of heat and of apparatus.

It is clear that it is not necessary to effect the separation of the mixtures of components obtained as a result of the extraction by distillation. The main point is that, for instance, the mixture HR+ME+S leaving the top of column 23 can be separated in some way outside the extraction process. Even this is not absolutely necessary if, for instance, a mixture of MR+LE is the product desired; in such a case the solvent alone has to be removed.

The process described in my Patents Nos. 2,023,109, 2,081,720 and 2,081,719 may also be used in conjunction with the present invention, as described in Figures 2 and 3.

An embodiment of the invention utilizing the process of the two last named patents is illustrated in Figure 3 where, for the sake of simplicity, a process is illustrated in which only two liquid mixtures are treated. Numerals 71 and 72 represent extraction apparatus, consisting of two zones, viz., extraction zones 71a, 72a and washing zones 71b, 72b, it being understood that either or both of these zones may consist of packed towers, or of numbers of alternate mixing and settling zones, or of any other type, and may, if desired, be a part of the same tower, as shown in the drawings. Although not absolutely essential, it is preferable that the extraction zones be capable of effecting countercurrent treatment. The columns are preferably provided with temperature regulating means, such as jackets 71c and 72c, whereby progressively lower temperatures may be maintained at successively lower points in the columns.

The two mixtures to be split up, L and H, are admitted into two extraction columns 71 and 72 through conduits 73 and 74 at about the middle. At the beginning of the process the solvent S enters column 71 at the top from tank 75, through pipe 76 and removes the component LE from the mixture L, so that a solution S+LE leaves the column at 77. As the other component, i. e., LR, of the mixture to be split up also dissolves in the solvent as a rule, although to a less extent, a solution of S+LE contaminated with LR would issue from the bottom of the column if no special precautions were taken. The component LR, which during the extraction has collected in the extract solution S+LE in the upper half of column 71, is removed from it again in the lower half of the column by washing with the aid of LE, which is let in for this purpose at the bottom of the column through a conduit 78 and valve 78'. Part of the component LE, which is obtained in the process, is used as washing agent. A correct regulation of the temperatures in the various zones of the extraction apparatus, as described in my Patent No. 2,081,720, ensures that a two-phase system is maintained everywhere. The washing agent LE washes the component LR out of the S+LE+LR solution and carries it back into the zone 71a of the column 71. Consequently, a mixture of LE+LR flows upwards from the bottom of the column, the mixture becoming richer and richer in LR. Ultimately the composition will be such that the same ratio LR:LE is attained as that which is in the mixture L. It is desirable to admit the mixture to be split up at the point in column 71 where this is the case.

The extract phase withdrawn at 77 is introduced as a solvent phase into one end of the extraction zone 72a of the column 72, as at 79, and serves as the extracting agent for the mixture H. Additional solvent may, if desired, be added through a conduit 79'. LE is washed out of the S+LE solution by the stream of H, which can be augmented by the addition of HR through a conduit 80 and valve 81, as described above in connection with Figure 2. By thus regulating the flow of H and/or HR, all of LE can be washed out and removed, through outlet 82, together with HR and, generally, a small amount of S. By admitting the proper amount of HE through a conduit 83 and valve 83' all of the HR present in the stream of S+HE+HR flowing downwards from the zone 72a through the zone 72b is washed out of that stream and returned into the zone 72a by the HE stream flowing upwards.

The extract phase consisting of S+HE is withdrawn from the column 72 at 84 and introduced into the zone 71a as the extracting agent, the flow of S from the conduit 76 being decreased so as to add only enough pure solvent to maintain the proper amount of S in the system. All of HE can be washed out of this S+HE solution by using the requisite amount of L, augmented, if necessary, by recycling a portion of LR through the conduit 86 and a valve 87. An HE+LR solution or raffinate phase, generally contaminated with a little of S, leaves the top of the column 71 at 88.

Columns 71 and 72 are provided with separation installations (e. g., distillation apparatus, as described in connection with Figure 2) 89, 90, 91 and 92. In the installation 89 HE is separated from S+LR, HE being withdrawn at 93; and in installation 91 S is separated from LR, the latter being withdrawn at 94, and the solvent being returned to 85, either directly as explained in connection with Figure 2, or through conduit 95, tank 75 and conduit 76. In a similar manner installations 90 and 92 are operated to produce HR at 96, LE at 97 and S at 98, which may be recycled to inlet 79 directly or through the conduit 79'. It is evident that the whole extraction process can effect a complete separation of both L and H into their components only if separations in the apparatus 89 to 92 are possible. All this depends, as is the case with every embodiment of the process according to this invention, in the last resort on the physical or chemical properties of the components LE, LR, HE, HR and the solvent S.

As pointed out above, it is not necessary that the special embodiment of the process according to the invention, in which the solvent is circulated through a plurality of extraction zones should be carried out in an apparatus consisting of extraction columns. Figure 4 shows diagrammatically a process in which use is made of a series of mixers and settling vessels or centrifugal separators. In Figure 4, 101 to 106 and 111 to 116 are two series of mixing devices, each provided with a corresponding series of settling vessels or centrifugal separators 121 to 126 and 131 to 136 respectively. Any number of such units may be employed in each series, and as many series must be provided as there are liquid mixtures to be separated. Thus, the process illustrated is that to be employed when two liquid mixtures L and H are to be split up into the components LR, LE, HR and HE by means of the solvent S, which moves in various cycles. In this diagram it is assumed that the raffinate layer is the lighter so that it floats on top in the settling vessels 121—126 and 131—136. The mixture L is introduced through a conduit 118 into the mixer 106, where it is mixed with a solvent phase or extract phase from the last settling stage 136. The stage 126 constitutes the introduction stage of the multi-stage extraction zone containing the stages 121 to 126, and stage 121 constitutes the last stage of this extraction zone. Similarly, the stage 131 constitutes the introduction stage of the multi-stage extraction zone comprising the stages 131 to 136, and the stage 136 constitutes the last stage of this extraction zone. Each raffinate phase produced in the series of settling vessels 121—126 is introduced into the adjacent lower numbered unit of the same series whereby LE is progressively removed from L.

The mixture H is introduced through a conduit 120 and mixed in the mixer 111, with the solution of extract LE in solvent issuing from the bottom of the settling vessel 121. After mixing in 111, a separation into two layers takes place in 131. The upper layer, or raffinate phase, which comprises the part of H that is insoluble in S, is led out of 131 at the top on the right to the mixer 112 and afterwards to 132. In 112 it is mixed with the extract phase from 122. The liquid running out of the bottom of the settling vessel 131 consists mainly of the solvent S and HE. The said liquid is conducted to the mixer 101, where it is mixed with the liquid flowing from the top of the settling vessel 122, which consists principally of LR. Should any LE still be present, then in the mixing or settling process in 101 or in 121 it passes into the other phase, which consists of S+HE, while HE passes into the liquid consisting substantially of LR. During the extraction process the liquid L which is to be split up runs upwards through the 6 mixers and settling vessels on the left in such a way that only the component LR issues from the top of 121. The component LE is exchanged for HE. This exchange has taken place as a result of the six cycles of the solvent S. The path followed by the solvent in one such cycle runs, for instance, from 101 to 121, from 121 to 111, from 111 to 131 and from 131 to 101. As the raffinate phase also absorbs some of the solvent, a mixture of LR+HE contaminated with S flows out of the settling vessel 121, which mixture is separated in the distillation apparatus 107 and 108. The solvent thereby released is returned to the system through a conduit 109, as shown in the drawings, or through a central solvent storage, as explained in connection with Figures 2 and 3. HE and LR are recovered at 127 and 128 respectively. As explained in connection with Figure 2, a part of the raffinate LR may be recycled through a conduit 129 and a valve 130. The liquid mixture H which is led into the mixer 111 exchanges the component HE for LE during the treatment in the mixers and settling vessels, so that a solution of LE and HR contaminated with S runs out of the last settling vessel 136. This mixture is separated in the distillation apparatus 117 and 118. The solvent can be returned to the system through a conduit 119 or through a central storage system. HR and LE are recovered at 137 and 138 respectively. Part of HR can be returned to the system through a conduit 139 and valve 140.

If it is necessary for the regulation of the process to recycle a portion of either extract produced, this may be effected by opening the valve or valves 141, 142 and permitting parts of LE and/or HE to flow through conduits 143 and/or 144 respectively. It is, by this expedient, possible to operate the process with a low throughput of any given liquid mixture, although a proper operation of the system requires a certain minimum quantity of liquid to pass through the units in order to obtain the proper exchange of components. It is, for example, possible to shut off the supply of L and to return all of LE and LR through the conduits 129 and 143. Also it is possible to recycle only LR.

The process according to the invention can be applied to all sorts of liquid mixtures. In various organic syntheses there are formed, for instance, mixtures of different groups of homologous compounds which cannot be separated according to their volatility. A common method of separation is first to make a number of fractions which have been separated according to volatility, and further to separate these fractions of narrow boiling ranges by extraction (thus according to their solubility).

According to the process of the invention the mixture is first separated according to volatility and the fractions are treated in a multi-stage extraction process, the solvent thereby being allowed to circulate, so that it need not be evaporated between stages. After an exchange of the components of the various mixtures has taken place as a result of the extraction, the resulting mixtures are separated according to volatility.

Thus nitrogen bases can be separated from hydrocarbon oils with the aid of phenol, oxidation products from non-oxidized paraffin wax with the aid of alcohol, chlorine compounds from the corresponding olefines with the aid of ethyl alcohol, chlorine compounds from the corresponding alcohols with the aid of water or polyvalent alcohols, alcohols from the corresponding olefines with the aid of water or polyvalent alcohols, and fatty acids from the alcohols prepared from them by reduction with the aid of mono-ethanolamine.

The process described with reference to Fig. 2 can be advantageously applied to the extraction of those hydrocarbon oils the boiling ranges of which do not overlap, such as kerosene, spindle oil and heavy machine oil. As extracting agent may be used, for example, liquid $SO_2$.

The process described with reference to Fig. 3 can be applied to the extraction of a kerosene and a lubricating oil with the aid of furfural, or to the extraction of transformer oil and a mixture of chlorine compounds and corresponding alcohols with the aid of a polyvalent alcohol.

In the extraction of the kerosene with furfural in the upper part of column 1 a solution of kerosene-extract and furfural is formed which also contains some kerosene-raffinate. In the lower part of column 1 this kerosene-raffinate is washed back from the extract solution (S+LE) with the aid of the kerosene-extract (LE) introduced at the bottom. Something analogous takes place at the bottom of column 2.

The selective solvent to be employed in a particular situation will be apparent to those skilled in the art, it being understood that my invention is not limited to the specific examples given herein. For example, in the extraction of hydrocarbon mixtures to separate paraffinic and non-paraffinic portions, selective solvents of the type of liquid $SO_2$ may be employed. A few of these are furfural, cresylic acid, $\beta\beta'$ dichloroethyl ether, quinoline, phenol, nitrobenzene, etc. Another example is the separation of a mixture of a higher alcohol and a phenol, which may be separated with the air or water. Numerous other examples are given in the patent of Van Dijck and Mayer, No. 2,081,721 (vide also British Patent No. 424,867).

I claim as my invention:

1. A process for the extraction of a plurality of at least two different initial liquid mixtures containing different components, each mixture containing a component which is preferentially soluble in a selective solvent and a component which is not preferentially soluble therein, comprising the steps of introducing each of said mixtures into a separate countercurrent extraction zone forming a part of a closed circuit of a plurality of extraction zones, the preferentially soluble component of each mixture being different from the preferentially soluble component of the mixture introduced into the next succeeding extraction zone of the circuit, and being soluble in the component of the mixture introduced into the said next succeeding extraction zone which is not preferentially soluble, introducing into each extraction zone an extracting agent containing said selective solvent and dissolved therein preferentially soluble component derived from the mixture introduced into the preceding extraction zone of the circuit, countercurrently contacting the introduced mixture and extracting agent in each extraction zone to form therein an extract phase containing said selective solvent and the preferentially soluble component of the mixture introduced into the respective extraction zone, and a raffinate phase containing the component of the mixture introduced into said respective extraction zone which is not preferentially soluble in the selective solvent and a material amount of the preferentially soluble component of the mixture introduced into the next preceding extraction zone of the circuit and which preferentially soluble component was dissolved in the extracting agent introduced into said respective extraction zone, separately withdrawing the extract and raffinate phases from the extraction zone, and using the extract phase withdrawn from each extraction zone as the extracting agent in the next succeeding extraction zone of the circuit.

2. A process for the extraction of a plurality of at least two different initial mixtures containing different components, each mixture containing a component which is preferentially soluble in a selective solvent and a component which is not preferentially soluble therein, the preferentially soluble component of the first mixture being separable from the component of the second mixture which is not preferentially soluble by physical means, comprising the steps of introducing each of said mixtures into a separate countercurrent extraction zone forming a part of a closed circuit of a plurality of extraction zones, said first mixture being introduced into the first extraction zone and said second mixture being introduced into the second extraction zone of said circuit, the preferentially soluble component of the first mixture being different from the preferentially soluble component of the second mixture, and being soluble in the component of the second mixture which is not preferentially soluble, introducing into each extraction zone an extracting agent containing said selective solvent and dissolved therein preferentially soluble component derived from the mixture introduced into the preceding extraction zone of the circuit, countercurrently contacting the introduced mixture and extracting agent in each extraction zone to form therein an extract phase containing said selective solvent and the preferentially soluble component of the mixture introduced into the respective extraction zone, and a raffinate phase containing the component of the mixture introduced into said respective extraction zone which is not preferentially soluble in the selective solvent and a material amount of the preferentially soluble component of the mixture introduced into the next preceding extraction zone of the circuit and which preferentially soluble component was dissolved in the extracting agent introduced into said respective extraction zone, separately withdrawing the extract and raffinate phases from the extraction zones, using the extract phase withdrawn from each extraction zone as the extracting agent in the next succeeding extraction zone of the circuit, treating the raffinate phase withdrawn from the second extraction zone by physical means to recover the component of the second mixture which is not preferentially soluble, and returning at least a portion of said recovered component into the second extraction zone so as to be present therein at a zone wherein the second liquid mixture is contacted with the extracting agent.

3. A process for the extraction of a plurality of at least two different initial mixtures having non-overlapping boiling ranges, each mixture containing a component which is preferentially soluble in a selective solvent and a component which is not preferentially soluble therein, comprising the steps of introducing each of said mixtures into a separate countercurrent extraction zone forming a part of a closed circuit of a plurality of extraction zones, introducing the preferentially soluble component of each mixture being soluble in the component of the mixture introduced in the next succeeding extraction zone which is not preferentially soluble, into each extraction zone an extracting agent containing said selective solvent and dissolved therein preferentially soluble component derived from the mixture introduced into the preceding extraction zone of the circuit, countercurrently contacting the introduced mixture and extracting agent in each extraction zone to form therein an extract phase containing said selective solvent and the preferentially soluble component of the mixture introduced into the respective extraction zone, and a raffinate phase containing the component of the mixture introduced into said respective extraction zone which is not preferentially soluble in the selective solvent and a material amount of the preferentially soluble component of the mixture introduced into the next preceding extraction zone of the circuit and which preferentially soluble component was dissolved in the extracting agent introduced into said respective extraction zone, separately withdrawing the extract and raffinate phases from the extraction zones, using the extract phase withdrawn from each extraction zone as the extracting agent in the next succeeding extraction zone of the circuit, and distilling at least one of the withdrawn raffinate phases to separate the preferentially soluble component from the component which is not preferentially soluble.

4. The process according to claim 3 in which the initial mixtures are hydrocarbon oils having non-overlapping boiling ranges.

5. A process for extracting two different initial mixtures, each mixture containing a component which is preferentially soluble in a selective solvent and a component which is not preferentially soluble therein, the preferentially soluble component of each mixture being soluble in and separable by distillation from the component of the other mixture which is not preferentially soluble, and the preferentially soluble component of the first mixture being different from the preferentially soluble component of the second mixture, comprising the steps of introducing the first mixture into a first countercurrent extraction zone, introducing the second mixture into a second countercurrent extraction zone, introducing into each extraction zone an extracting agent containing said selective solvent and dissolved therein preferentially soluble component derived from the mixture introduced into the other extraction zone, countercurrently contacting the introduced mixture and extracting agent in each extraction zone to form extract and raffinate phases, the extract phase in the first extraction zone containing said selective solvent and the preferentially soluble component of the first mixture, the raffinate phase in the first extraction zone containing the component of the first mixture which is not preferentially soluble together with a material amount of the preferentially soluble component of the second mixture, the extract phase in the second extraction zone containing said selective solvent and the preferentially soluble component of the second mixture, and the raffinate phase in the second extraction zone containing the component of the second mixture which is not preferentially soluble and a material amount of the preferentially soluble component of the first mixture, separately withdrawing said extract and raffinate phases from the extraction zones, using the extract phase from the first extraction zone as the extracting agent in the second extraction zone, using the extract phase from the second extraction zone as the extracting agent in the first extraction zone, and separately distilling said first and second raffinate phases to separate the preferentially soluble component from the component which is not preferentially soluble.

6. The process according to claim 5 in which at least a portion of the component of the first mixture which is not preferentially soluble and which is recovered by distilling the first raffinate phase is returned to the first extraction zone where the first mixture is subjected to countercurrent contact with the extracting agent.

7. A process for the extraction of a plurality of at least two different initial mixtures containing different components, each mixture containing a component which is preferentially soluble in a selective solvent and a component which is not preferentially soluble therein, the preferentially soluble component of the first mixture being soluble in and separable from the component of the second mixture which is not preferentially soluble by physical means, and the preferentially soluble component of the first mixture being different from the preferentially soluble component of the second mixture, comprising the steps of introducing each of said mixtures into a separate countercurrent extraction zone forming a part of a closed circuit of a plurality of extraction zones, said first mixture being introduced into the first extraction zone and said second mixture being introduced into the second extraction zone of said circuit, introducing into each extraction zone an extracting agent containing said selective solvent and dissolved therein preferentially soluble component derived from the mixture introduced into the preceding extraction zone of the circuit, countercurrently contacting the introduced mixture and extracting agent in each extraction zone to form therein an extract phase containing said selective solvent and the preferentially soluble component of the mixture introduced into the respective extraction zone, and a raffinate phase containing the component of the mixture introduced into said respective extraction zone which is not preferentially soluble in the selective solvent and a material amount of the preferentially soluble component of the mixture introduced into the next preceding extraction zone of the circuit and which preferentially soluble component was dissolved in the extracting agent introduced into said respective extraction zone, separately withdrawing the extract and raffinate phases from the extraction zones, treating the raffinate phase withdrawn from the second extraction zone by physical means to concentrate the preferentially soluble component of the first mixture, contacting the extract phase withdrawn from the first extraction zone in a washing zone with a portion of said concentrated preferentially soluble component to form an improved final extract phase and to separate therefrom components of the first mixture which are not preferentially soluble, and using the final extract phase from each extraction zone as the extracting agent in the next succeeding extraction zone of the circuit.

8. A process for the extraction of two different initial liquid mixtures containing different components, each mixture containing a component which is preferentially soluble in a selective solvent and a component which is not preferentially soluble therein, the preferentially soluble components of the two mixtures being different from one another and the preferentially soluble component of each mixture being soluble in the component of the other mixture which is not preferentially soluble comprising the steps of introducing each of said mixtures into a separate multistage extraction zone at an introduction stage other than the last stages of the zones, introducing an extracting agent containing said selective solvent into each stage of each extraction zone, contacting the introduced mixture and the extracting agent in each of said introduction stages to form an extract phase containing the selective solvent and the preferentially soluble component of the mixture introduced into the respective introduction stage and a raffinate phase containing the component of the mixture introduced into the respective introduction stage which is not preferentially soluble in the selective solvent, withdrawing a raffinate phase from each extraction stage and introducing each withdrawn raffinate phase except that withdrawn from the last extraction stage of each zone into the next succeeding stage of the same extraction zone, contacting the introduced raffinate phase and the extracting agent in each stage other than said introduction stages to form therein an extract phase containing the selective solvent and a raffinate phase containing the component of the mixture introduced into the extraction zone containing the respective stage which is not preferentially soluble, the raffinate phase from the last stage of each extraction zone containing a material amount of the preferentially soluble component of the mixture introduced into the other extraction zone, withdrawing the extract phase from each extraction stage and using it as the extracting agent in the extraction stage of the other extraction zone which is removed by as many stages from the introduction stage of its extraction zone as the stage from which the respective extract was withdrawn is removed from the last stage of its extraction zone.

9. The process according to claim 8 wherein the raffinate phase withdrawn from the last stage of one of the extraction zones is treated to concentrate the component of the mixture introduced into said extraction zone which is not preferentially soluble in the selective solvent, and at least a portion of said concentrated component is introduced into the same extraction zone.

WILLEM J. D. van DIJCK.